April 14, 1964  W. M. NONNAMAKER  3,128,815
SIDEWALL AND PNEUMATIC TIRE COMBINATION
Filed May 16, 1962
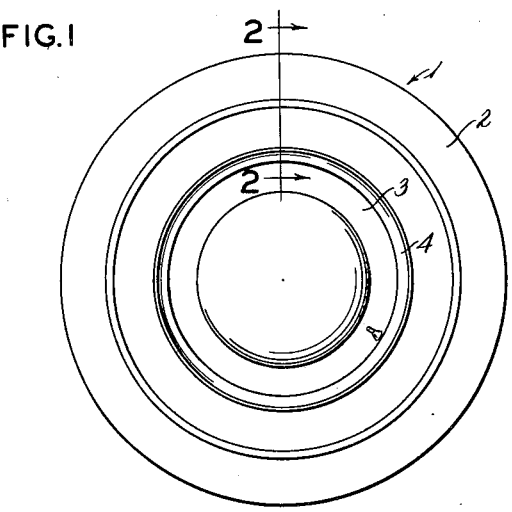
FIG. 1
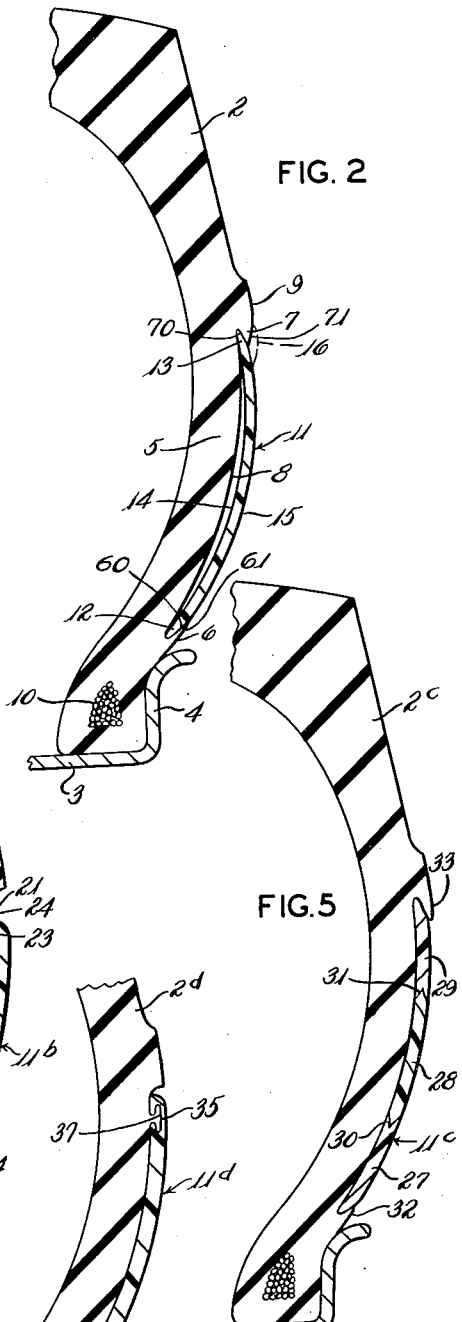
FIG. 2
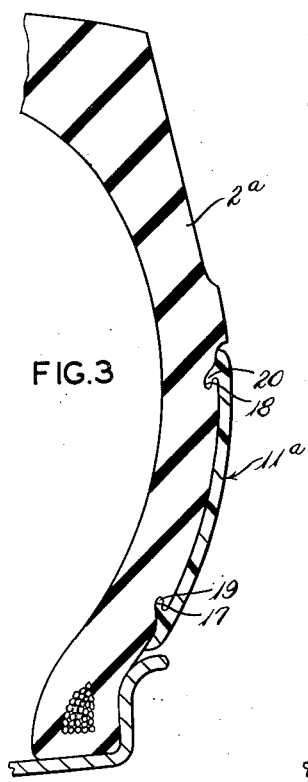
FIG. 3
FIG. 4
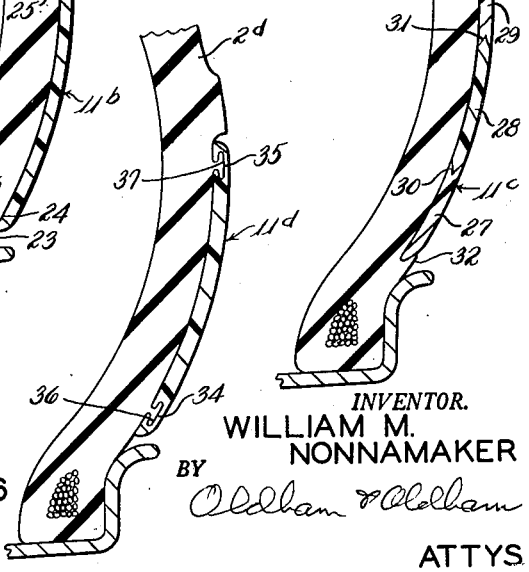
FIG. 5
FIG. 6
INVENTOR.
WILLIAM M. NONNAMAKER
BY Oldham & Oldham
ATTYS.

United States Patent Office 3,128,815
Patented Apr. 14, 1964

3,128,815
SIDEWALL AND PNEUMATIC TIRE
COMBINATION
William M. Nonnamaker, Akron, Ohio, assignor to The Mohawk Rubber Company, Akron, Ohio, a corporation of Ohio
Filed May 16, 1962, Ser. No. 195,232
11 Claims. (Cl. 152—353)

This invention relates to pneumatic tire sidewalls or trim members, and to a sidewall and pneumatic tire combination, especially to a sidewall for removable attachment to a pneumatic tire by mechanical engagement therewith.

At the present time there is an appreciable commercial demand for pneumatic tires having sidewalls of different color than the remainder of the tire. Normally tires have black tread and sidewalls but the provision of a white, or colored area in the sidewall has been in great demand by the purchasing public and has been provided by nearly all tire manufacturers. These sidewalls, usually white, are built integrally with the pneumatic tires by known procedures. However, such white sidewall tires are costly to build and involve relatively expensive manufacturing procedures.

There have been efforts made heretofore to provide removable sidewalls or trim members for use with black sidewall tires so as to simulate a white sidewall tire without the attendant disadvantages of building such tire sidewall or trim ring integrally with the tire. Such type of an article has great advantages because it avoids the relatively costly, special processing required in producing tires with integral sidewalls. Some of these removable sidewalls or trim members that have been provided heretofore have been of the type that has a radially inner edge or flange section that is physically interlocked between a tire bead and a wheel flange when the tire is deflated and is being positioned on the wheel. Such sidewalls are objectionable because they are relatively difficult to mount and dismount.

There have been other efforts made to provide simulated white sidewalls to be carried by wheel assemblies to extend up radially over a portion of the tire sidewall and where the sidewalls have been secured to the tire and wheel assembly by means of a wheel cover which attaches the removable sidewall to the assembly, or by use of a hub cap that engages a radially inner portion of the sidewall to secure it in place.

Yet another problem that is encountered in endeavoring to provide simulated natural white sidewalls on tire and wheel combinations is that some of such simulated sidewalls are made from such relatively stiff material, or material that does not have the appearance of rubber so that it is readily identified as being a simulated sidewall. Yet other problems that are encountered in these removable sidewalls and their association with the tires is that the sidewall may have a much smaller diameter than the rim diameter and again be apparent that it is not a true natural sidewall. Other simulated sidewalls have not been completely satisfactory because they have been thrown from the tire and wheel assemblies when in use, or have been cut into several pieces when in use, or have worn undesirable grooves in the tire.

It is the general object of the present invention to provide a novel and improved tire sidewall or trim member characterized by the fact that the sidewall is mechanically engaged with the tire sidewall for removable attachment thereto.

Another object of the invention is to avoid the difficulties pointed out hereinbefore in the appearance of simulated white sidewalls that are removably attached to a tire and wheel assembly and to provide a tire sidewall that can be readily attached to a tire sidewall for operative mechanical engagement therewith by the average person.

Another object of the invention is to provide removable sidewall members for attachment to tires and where the sidewall can be placed in tension, or in compression to aid in securing the sidewall to the tire.

Other objects of the invention are to provide several annular concentric interlocked rings that can be assembled into a unit for attachment to a tire sidewall for decorative purposes and which several rings may be of different colors; to provide tire sidewalls of relatively thin flatly curved shapes that can be mechanically interlocked at both their radially inner and radially outer edges over the entire annular length thereof with rib or shoulder means on a tire for operative association therewith; to provide complementary shaped end portions on a removable sidewall or trim member and grooves, ribs or beads on a tire body for mechanical interlocked engagement between the tire and the removable trim member; to provide stiffened or reenforced portions in the radially inner and radially outer edges of a tire trim or sidewall member for more positive engagement with a pneumatic tire sidewall; and to provide a tire sidewall and pneumatic tire combination that can be made from either new tires as originally molded, or it can be made from retread or other specially prepared tires.

The foregoing and other objects and advantages of the invention will be made more apparent as the specification proceeds.

In order to better understand the invention, attention now is directed to the accompanying drawings, wherein:

FIG. 1 is a side elevation of a sidewall and pneumatic tire combination, embodying the principles of the invention, shown positioned on a conventional wheel;

FIG. 2 is an enlarged fragmentary vertical section taken on line 2—2 of FIG. 1;

FIG. 3 is a vertical section, like FIG. 2, of a modification of the invention showing a different engagement between the removable sidewall and the pneumatic tire;

FIG. 4 is a vertical section, like FIG. 2, showing a modification of the invention wherein specially shaped grooves are formed in the tire sidewall and complementary shaped feet or beads are provided on the sidewall for engagement with the tire grooves;

FIG. 5 is a vertical section, like FIG. 2, of a further modification of the invention and wherein a plurality of separate rings are combined to form the removable sidewall; and FIG. 6 is yet a further fragmentary vertical section, like FIG. 2, of a modification of the invention wherein protruding ribs are provided on the tire and complementary shaped recesses are formed on the sidewall to provide mechanical engagement between the sidewall and the tire for operative association thereof.

When referring to corresponding members shown in the drawings and referred to in the specification, corresponding numerals are used to facilitate comparison therebetween.

Generally speaking, the present invention relates to a pneumatic tire and a removable, resilient, axially thin annular trim member, or sidewall, of a flatly curved contour engaged with the tire to cover a portion of the sidewall thereof, which tire has a pair of integral, concentric, radially spaced, circumferentially extending tire trim engaging means on the sidewall thereof, which trim member is of a radial length to extend between the said means and it has radially inner and outer portions shaped complementary to the tire trim engaging means to be mechanically but removably secured thereto whereby the trim member can be engaged with and removed from the tire when it is operatively positioned on a wheel.

Reference now is directed particularly to the details of the structure shown in the accompanying drawings, and a tire and wheel assembly is indicated by the numeral 1. Such wheel assembly is made up from a substantially conventional pneumatic tire 2 that is operatively positioned on a wheel 3, which has a wheel flange 4 thereon.

It is an important feature of the invention that the tire 2 in a sidewall section or area 5 thereon is provided on its outer surface with a pair of opposed, undercut or overhanging radially inner and radially outer annular shoulders 6 and 7, respectively. These shoulders 6 and 7, in effect, form a circumferentially extending groove 8 in the sidewall 5 of the tire 2. The overhanging shoulders 6 and 7 also form, or define grooves 60 and 70, respectively, therebelow and the shoulders have adjacent edges, or end walls 61 and 71, respectively, positioned in opposed relation in the tire sidewall. The circumferentially extending groove 8 is formed by and extends between the adjacent edges or end walls 61 and 71 of the shoulders 6 and 7. The tire 2 also has a protruding scuff rib or bead 9 formed thereon and extending circumferentially of the tire intermediate the tread portion thereof and a tire bead 10. Such tire bead 10 is seated on the wheel 3 against the wheel flange 4 in a conventional manner for operatively positioning the tire. The radially outer shoulder 7 may form the radially inner margin of the scuff rib 9.

A novel and improved positioning of a tire sidewall, or trim member 11 is obtained by constructing such tire trim member of annular form and of such a radial length that the radially inner and radially outer edge portions thereof 12 and 13, respectively, are adapted to be removably but mechanically interlocked with the tire 2 by positioning such edge portions wedged under the shoulders 6 and 7 provided on the sidewall 5 of the tire.

It should be realized that the sidewall, or tire trim member 11 may be made from any suitable material, and natural rubbers, synthetic rubbers, rubber-like materials, and other plastic substances can be used in making this sidewall or trim member 11. One suitable plastic material for producing the trim member would be nylon, and yet another material would be "Marlex," which is a material made by the Phillips Petroleum Company and is an olefin polymer. In all events, the tire trim member 11 is resilient and flexible and can be constructed, or compounded to have resiliency and/or stiffness to any suitable extent depending upon the actual properties desired in the trim member. The trim member is normally of flatly curved shape and has a concave inner face 14 and a flatly convex outer face 15. Usually the tire trim member 11 is of substantially uniform thickness for the major portion of the radial width thereof and gradually reduces in thickness adjacent the ends thereof to provide relatively blunt end portions thereon of a size and shape to be snugly gripped between and in under the shoulders 6 and 7. The ends or edges 12 and 13 normally are complementary in shape to the grooves 60 and 70 provided in the tire sidewall.

Normally the tire trim member 11 would be of substantially the same size from radially inner to radially outer margins thereof as the effective distance between the margins of the grooves 60 and 70, although it also is possible in practice of the invention to make this tire trim member of slightly less radial length than this distance to permit the tire trim member to more or less "float" between the grooves 60 and 70 formed at the positioning shoulders 6 and 7. In some instances, however, it may be desirable to place the tire trim member under slight compression when it is operatively positioned and then the tire trim member would be slightly longer in radial length than the distance between the margins of the grooves 60 and 70. Hence the tire trim member may bow or arc up slightly over the tire sidewall 5, as indicated in the drawing in FIG. 2.

It is preferred that the shoulders 6 and 7 be continuous annular shoulders that extend around the circumference of the tire but in some instances it may be desirable to interrupt these shoulders into circumferentially spaced sections so as to facilitate one's positioning of a tire trim member on the tire sidewall 5, or the removal therefrom.

It will be realized that the angle of inclination and the height of the shoulders 6 and 7 with relation to the adjacent flat surface of the tire, such as the bottom surface of the groove 8 can be varied appreciably, as desired, in order to obtain the desired interlocked but removable engagement of the tire trim member and tire. It also would be possible, in some instances, to embed a flexible reenforcing member, such as a metal wire tire trim bead at both the radially inner and radially outer margins of the trim member for reenforcing such members in such areas and for aiding in retaining the trim member edges engaged in under the tire shoulders. Or, substantially the same effect might be obtained by curing these trim members in molds where the end portions of the tire trim member, or sidewall have higher temperatures applied thereto during curing so that a harder rubber or plastic section is provided at the edge portions of the trim members. This result also might be obtained by precuring the inner and outer edge portions of the sidewall, or by using a semi-cured stock to form the edge portions of the sidewall.

It might also be desirable in some instances to form a little overhanging lip, as indicated at 16, in dotted lines in FIG. 2 of the drawings, on the tire trim member 11 to cover the connection between the trim member and the overhanging shoulders 6 and 7 and provide a more attractive finish in the operative assembly of the tire and trim member. A similar lip may also be provided on the radially inner edge of the tire trim member. Also, the lip 16 may aid in retaining the trim member in position.

A modified type of a sidewall or tire trim member, where such tire trim member can be placed under some tensional forces when operatively positioned, is shown in FIG. 3. Such tire trim member 11a is shown engaged with a tire 2a by means including a pair of radially spaced, oppositely inclined grooves 17 and 18 formed in the rubber surface layer of the tire sidewall. The groove 17 is the radially inner groove and it extends generally radially outwardly but is also slightly inclined axially inwardly in the tire carcass, whereas the groove 18 is the radially outer groove and such groove 18 extends generally radially inwardly but is inclined slightly axially inwardly of the tire 2a. The trim member 11a then is provided with lips, sections, or flanges 19 and 20 that are complementary in shape to the grooves 17 and 18 and with the tire trim member 11a being of such size that these lips 19 and 20 are complementary in shape to the grooves 17 and 18 and are snugly received therein for good mechanical interlocked engagement with the tire 2a for removably positioning the sidewall member of the invention in good mechanical engagement with the tire.

FIG. 4 shows another modified tire 2b wherein a further modified type of a sidewall or trim member 11b is removably and operatively mechanically interlocked with the tire sidewall for retaining such sidewall or trim member in operative engagement with the tire, usually by the provision of some tensional forces in the tire trim member. The drawing shows that means in the form of substantially T-shaped, in section, annular, circumferentially extending grooves 21 and 22 are provided in the tire sidewall and that these grooves 21 and 22 have overhanging edge flanges, or lips 23 and 24 provided therefor on their radially inner and radially outer margins, respectively. Thus a positive mechanical interlock is obtained between the tire trim member 11b and tire 2b by the provision of means such as substantially T-shaped in section edge lips or flanges 25 and 26 on the tire trim member 11b and complementary in shape to the grooves 21 and 22. These edge flanges or lips 25 and 26 can be progressively worked into engagement with the grooves 21 and 22 to seat in under the lips 23 and 24 of the tire. It should be realized that in some instances it may be desirable to make the grooves 21 and 22 substantially L-shape in section, and to eliminate the portions of these grooves that extend towards each other in the grooves shown in FIG. 4. Then likewise the lips or flanges 25 and 26 on the tire trim member would be of a similar L-shape with the foot portion of the lips extending radially inwardly of the lip 23 of the groove 22 and extending radially outwardly of the radially outer lip 24 of the groove 21 of the tire trim member for a good mechanical interlock with the tire carcass.

In some instances it may be desirable to provide relatively narrow strips or sections in the tire trim member, and so FIG. 5 shows a tire trim member 11c which is in operative engagement with a tire 2c. In this instance, the trim member 11c is made from a plurality of radially narrow rings or bands 27, 28 and 29. These rings 27, 28 and 29 have adjacent abutted edges with interengaging portions thereon for interlocking the individual rings to provide the tire trim member. In the particular embodiment of the invention shown, for example, the rings 27 and 29 are made from white material, whereas the intermediate ring 28 might, for example, be made from black plastic, or equivalent material. It will be seen that the intermediate ring 28 is shown with projecting ribs 30 and 31 formed thereon and which engage in complementary formed seats provided in the abutted surfaces of the radially inner and radially outer rings 27 and 29. Normally the rings 27, 28 and 29 would be engaged with each other and then would be operatively associated with overhanging flanges 32 and 33 provided on the tire 2c. Such overhanging shoulders or ribs 32 and 33 would be very similar to the rib or shoulder construction shown in the tire 2, shown in FIG. 2, and the trim member 11c would engage therewith in the manner previously described.

The construction shown in FIG. 6 is substantially the reverse from the construction of FIG. 4 and in this instance a tire trim member 11d is shown operatively secured to a tire 2d. In this instance, the tire 2d has a pair of substantially T-shaped in section ribs 34 and 35 provided thereon and extending circumferentially thereof. These ribs naturally would be formed integrally with the tire by being molded into the tire carcass, or by being otherwise formed thereon so that they can engage with complementary shaped grooves or recesses 36 and 37 provided on the tire trim member 11d. In this instance, the tire trim member is of a radial length so as to extend between the ribs 34 and 35 and be pressed or worked into operative mechanical interlocked engagement with such ribs by forcing the grooves 36 and 37 against the protruding ribs.

It should be realized that in all embodiments of the invention, the annular, circumferentially extending tire trim members may be formed of any desired radial width or length. Usually such tire trim members will be of a sufficient size that they will extend substantially to a mid section of the tire sidewall, such as to a point immediately adjacent the scuff rib 9 provided on the tire 2 from a point immediately adjacent the wheel flange 4. By forming these tire trim members from a resilient rubber-like material and having such trim members positioned on the tire and seemingly exactly in the same manner as permanent sidewalls, a very attractive and useful product is obtained. This trim member will be held in place against all normal forces exerted thereon in use of the wheel on which the tire and sidewall assembly is operatively positioned.

It should be realized that the ribs and grooves shown in the sidewall portions of the various tires of the invention can be formed by molding them into the tire by either the original molding action in forming the tire or by recapping, or retreading operations. It also may be desirable to buff or grind the tire sidewalls so as to provide means, like the groove 8 and overhanging shoulders 6 and 7 therein on the tire after which a tire trim member of the invention could be operatively associated therewith. Or, the tire could be cut in any desired manner to form circumferentially extending grooves, ribs, shoulders, or the like therein.

In some instances, such as when using the tire trim member 11 in association with the shoulders 7 and 8, a plurality of circumferentially or radially extending ribs and grooves could be provided on the inner surfaces of these shoulders and with the axially outer surfaces of the edges of the tire trim member having complementary shaped ribs and grooves formed thereon to aid in retaining the tire trim member in good mechanical interlocked engagement with the overhanging shoulders provided on the tire body or carcass. It also might be desirable to provide small enlargements or beads or edge caps on the ends of tire trim members, like the tire trim member 11, to seat in grooves formed where the shoulders 6 and 7 merge with the tire sidewall. In this instance, such beads or end caps could be formed integrally with the tire or separately from a strip of material of a different plastic than that of the tire trim member. The end caps could be of substantially "C-shape" in section to engage the end portion of the tire trim snugly and aid in seating such tire trim member by seating in recesses that are shaped complementary to the external or outer surfaces of these end caps provided on the tire trim member.

Naturally when making the tire trim members of the invention, they can be prepared in any suitable color, but usually would be white. In some instances a plurality of the members like the tire trim member 11 might be secured to a tire in radially spaced portions thereof by making each one of the tire trim members of a relatively narrow or short radial length and providing a plurality of pairs of overhanging shoulders 6 and 7 for attaching these individual rings in concentric but radially spaced relation to the sidewall portions of a pneumatic tire. Or, several sets of the other tire trim member securing means of the invention may be used to position such narrow rings.

As previously indicated, the stiffness and/or resiliency of the sidewalls, or trim members of the invention may vary appreciably. Hence if the trim members are to be placed in compression or tension on the tire, usually the main body portion of the trim members should be softer and more resilient than the tire. The trim member 11, for example, when slightly smaller than its positioning space, preferably would be stiffer than a tire sidewall and more resistant to radial deflection than the tire.

Normally the grooves and shoulders formed in the tire would only be present in the rubber outer layer of the tire sidewall. The scuff ribs on the tire may extend out axially beyond the adjacent edge of the trim member to aid in protecting the trim member and its engagement with the tire.

From the foregoing, it is believed that it will be seen that a novel and improved tire sidewall, or trim member and its combination with a pneumatic tire has been disclosed. This trim member is removably associated with the tire body but closely approximates the positioning, appearance and action of a sidewall element integrally bonded to the tire carcass. The sidewall and trim member of the invention can be prepared at relatively low cost and only a minimum of extra work would be required on a tire mold in order to provide the desired interengaging or mechanical interlocking means on the tire for use with the tire sidewall to hold it in engagement with the tire. At the same time, the owner of the tire can remove the sidewall from the tire and use the tire in its normal condition, if desired, or he could apply trim members of different colors to the tires at different times, if desired. Hence it is believed that the objects of the invention have been achieved.

While several complete embodiments of the invention have been disclosed herein, it will be appreciated that modification of these particular embodiments of the invention may be resorted to without departing from the scope of the invention as defined in the appended claims.

What I claim is:

1. The combination of a pneumatic tire with an annular tire trim member engaging said tire sidewall where said tire has a continuous annular radially outwardly facing flexible overhanging shoulder formed thereon in the sidewall thereof and a continuous annular flexible radially inwardly facing overhanging shoulder formed on a radially outer portion of said tire sidewall, said tire trim member being thicker at the radial center thereof and tapering to radially outer and inner edges contoured to be received under said shoulders, said tire trim member having substantially uniform flexibility at all portions thereof, said tire trim member being of a radial length greater than the distance between the adjacent edges of said shoulders to have the edge portions of said trim member received under said shoulders to be secured to the tire thereby.

2. The combination of a pneumatic tire with an annular flexible tire trim member engaging a sidewall of said tire where said tire has a continuous annular radially outwardly facing flexible overhanging shoulder formed thereon in said tire sidewall and a continuous annular flexible radially inwardly facing overhanging shoulder formed on a radially outer portion of said tire sidewall, said tire trim member comprising resilient material and said tire trim member having substantially uniform flexibility at all portions thereof, said tire trim member being of a radial length greater than the distance between the adjacent portions of said shoulders, said tire trim member having its radially inner and outer edges received under the overhanging portions of said shoulders to be secured to said tire by said edges, said shoulders both being positioned radially outwardly of the bead portion of said tire, said trim member being of substantially uniform thickness for the major portion of the radial width thereof.

3. The combination of a pneumatic tire with an annular flexible tire trim member engaging a sidewall of said tire, a continuous annular radially outwardly facing flexible overhanging shoulder formed on said tire sidewall, a continuous annular flexible radially inwardly facing overhanging shoulder formed on a radially outer portion of said tire sidewall, said shoulders defining an annular groove therebetween that extends around the circumference of said sidewall, said tire trim member comprising resilient material and said tire trim member having substantially uniform flexibility at all portions thereof, said tire trim member being of a radial length greater than the distance between the adjacent portions of said shoulders, said tire trim member being positioned in said groove and having its radially inner and outer edges received under the overhanging portions of said shoulders to be secured to said tire thereby, said tire trim member being free for movement relative to said tire.

4. In combination, a pneumatic tire, and a removable resilient, axially thin annular trim member of a flatly curved contour engaged with and extending around the circumference of a sidewall portion of said tire, said tire having a pair of concentric radially spaced tire trim engaging means formed integrally therewith on the sidewall thereof, said trim member having radially inner and outer portions shaped complementary to said tire trim engaging means and engaging therewith to be mechanically but removably secured thereto, said trim member having a different resistance to radially directed load than said tire, said tire trim member being made from a plurality of concentric rings which are in radial alignment with the adjacent edges thereof abutted, said adjacent edges having interengaging portion thereon to interlock said rings.

5. In combination, a pneumatic tire, and a removable, resilient, axially thin annular trim member of a contour complementary to a tire sidewall engaged with said tire to cover a portion of the sidewall thereof, said tire having a pair of integral, annular, concentric, radially spaced, circumferentially extending tire trim engaging means on the sidewall thereof, said trim member being of a radial length to extend between said means and having radially inner and outer portions shaped complementary to said tire trim engaging means and mechanically but removably secured thereto whereby the trim member can be engaged with and removed from said tire when operatively positioned in a wheel assembly, said tire trim engaging means comprising a pair of opposed overhanging shoulders, and said tire trim member being made from a plurality of concentric rings which are in radial alignment with the adjacent edges thereof abutted, said adjacent edges having interengaging portions thereon to interlock said rings.

6. In combination, a pneumatic tire, and a removable resilient, axially thin annular trim member of substantially uniform flexibility at all portions thereof engaged with said tire to cover a portion of the sidewall thereof, said tire having a pair of integral, annular, at least substantially concentric, radially spaced, resilient, circumferentially extending tire trim engaging means on the sidewall thereof spaced radially outwardly from the wheel flange engaging bead of said tire, said trim member being of a radial length to extend between said tire trim engaging means and having radially inner and outer edge portions shaped substantially complementary to said pair of tire trim engaging means and mechanically but removably engaging and extending between said pair of tire trim engaging means on said sidewall whereby the trim member can be engaged with and removed from said tire, when operatively positioned in a wheel assembly, said tire trim engaging means comprising a pair of concentric, radially spaced, circumferentially extending trim engaging grooves in the rubber surface layer of the tire sidewall in an area intermediate the tread portion and the tire bead but positioned radially outwardly from the wheel flange engaging portion of said bead, said radially inner groove extending generally radially outwardly but being inclined axially inwardly of the said tire and said radially outer groove extending generally radially inwardly and being inclined axially inwardly of said tire, said trim member extending between said grooves and having radially inner and outer portions with axially offset lips thereon shaped complementary to said tire trim engaging grooves to be received therein whereby said trim member can be mechanically but removably secured to said tire.

7. In combination, a pneumatic tire, and a removable resilient, axially thin annular trim member of substantially uniform flexibility at all portions thereof engaged with said tire to cover a portion of the sidewall thereof, said tire having a pair of integral, annular, at least substantially concentric, radially spaced, resilient, circumferentially extending tire trim engaging means on the sidewall thereof spaced radially outwardly from the wheel flange engaging bead of said tire, said trim member being of a radial length to extend between said tire trim engaging means and having radially inner and outer edge portions shaped substantially complementary to said pair of tire trim engaging means and mechanically but removably engaging and extending between said pair of tire trim engaging means on said sidewall whereby the trim member can be engaged with and removed from said tire when operatively positioned in a wheel assembly, said tire trim engaging means comprising a pair of of concentric, converging, radially spaced, circumferentially extending tire trim engaging grooves in the rubber surface layer of the tire sidewall in an area intermediate the tread portion and the tire bead but positioned radially outwardly from the wheel flange engaging portion of said bead, said trim member extending between said grooves and having radially inner and outer portions with axially offset lips thereon shaped complementary to said tire trim engaging grooves to be received therein whereby said trim member is mechanically but removably secured to said tire.

8. In combination, a pneumatic tire, and a removable resilient, axially thin annular trim member of substantially uniform flexibility at all portions thereof engaged with said tire to cover a portion of the sidewall thereof, said tire having a pair of integral, annular, at least substantially concentric, radially spaced, resilient, circumferentially extending tire trim engaging means on the sidewall thereof spaced radially outwardly from the wheel flange engaging bead of said tire, said trim member being of a radial length to extend between said tire trim engaging means and having radially inner and outer edge portions shaped substantially complementary to said pair of tire trim engaging means and mechanically but removably engaging and extending between said pair of tire trim engaging means on said sidewall whereby the trim member can be engaged with and removed from said tire when operatively positioned in a wheel assembly, said tire trim engaging means comprising a pair of concentric, radially spaced tire trim engaging T-shaped grooves in the tire sidewall and extending around the circumference thereof, the stem of said T-shaped groove being parallel to the axis of said tire, said grooves each having radially inner and radially outer overhanging lips provided therefor, said trim member having radially inner and outer portions with axially offset T-shaped in section ribs on the axially inner surface thereof shaped complementary to said tire trim engaging grooves and received in said grooves for removably securing said trim member to said tire.

9. In combination, a pneumatic tire, and a removable resilient, axially thin annular trim member of substantially uniform flexibility at all portions thereof engaged with said tire to cover a portion of the side wall thereof, said tire having a pair of integral, annular, at least substantially concentric, radially spaced, resilient, circumferentially extending tire trim engaging means on the sidewall thereof spaced radially outwardly from the wheel flange engaging bead of said tire, said trim member being of a radial length to extend between said tire trim engaging means and having radially inner and outer edge portions shaped substantially complementary to said pair of tire trim engaging means and mechanically but removably engaging and extending between said pair of tire trim engaging means on said sidewall whereby the trim member can be engaged with and removed from said tire when operatively positioned in a wheel assembly, said tire trim engaging means comprising a pair of concentric, radially spaced tire trim engaging grooves in the tire sidewall and extending around the circumference thereof, said grooves each having at least one overhanging lip provided therefor to provide at least a pair of spaced opposed lips on said tire sidewall, said trim member having radially inner and outer edge portions with axially offset ribs on the axially inner surface thereof shaped complementary to said tire trim engaging grooves to be received in said grooves and to engage said lips and be removably secured thereby to said tire.

10. In combination, a pneumatic tire, and a removable resilient, axially thin annular trim member of substantially uniform flexibility at all portions thereof engaged with said tire to cover a portion of the sidewall thereof, said tire having a pair of integral, annular, at least substantially concentric, radially spaced, resilient, circumferentially extending tire trim engaging means on the sidewall thereof spaced radially outwardly from the wheel flange engaging bead of said tire, said trim member being of a radial length to extend between said tire trim engaging means and having radially inner and outer edge portions shaped substantially complementary to said pair of tire trim engaging means and mechanically but removably engaging and extending between said pair of tire trim engaging means on said sidewall whereby the trim member can be engaged with and removed from said tire when operatively positioned in a wheel assembly, said tire trim engaging means comprising a pair of concentric T-shaped radially spaced annular circumferentially extending ribs formed on the tire sidewall radially outwardly of said tire engaging flange, said tire trim member having radially outer and inner edges having recesses therein contoured complementary to and engaging said ribs, said tire trim member being of a radial length slightly greater than the distance between said ribs.

11. The combination of a pneumatic tire with an annular flexible tire trim member engaging a sidewall of said tire, a continuous annular radially outwardly facing flexible overhanging shoulder formed on said tire sidewall, a continuous annular flexible radially inwardly facing overhanging shoulder formed on a radially outer portion of said tire sidewall, said shoulders defining an annular groove therebetween that extends around the circumference of said sidewall, said tire trim member comprising resilient material having flexibility at all portions thereof, said tire trim member being of a radial length greater than the distance between one radial margin of said groove and the closest portion of the shoulder at the opposite margin of said groove, said tire trim member being positioned in said groove and having its radially inner and outer edges received under the overhanging portions of said shoulders to be secured to said tire thereby, said tire trim member being free for movement relative to said tire.

References Cited in the file of this patent

UNITED STATES PATENTS

| | | |
|---|---|---|
| 1,202,968 | Cole | Oct. 31, 1916 |
| 1,268,258 | Manuel | June 4, 1918 |
| 2,963,326 | Wood | Dec. 6, 1960 |

FOREIGN PATENTS

| | | |
|---|---|---|
| 192,772 | Austria | Nov. 11, 1957 |
| 1,210,695 | France | Oct. 5, 1959 |